United States Patent
Escuti et al.

(10) Patent No.: US 8,339,566 B2
(45) Date of Patent: Dec. 25, 2012

(54) LOW-TWIST CHIRAL LIQUID CRYSTAL POLARIZATION GRATINGS AND RELATED FABRICATION METHODS

(75) Inventors: Michael James Escuti, Cary, NC (US); Chulwoo Oh, Los Angeles, CA (US); Ravi Komanduri, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 303 days.

(21) Appl. No.: 12/596,189

(22) PCT Filed: Apr. 16, 2008

(86) PCT No.: PCT/US2008/004888
§ 371 (c)(1),
(2), (4) Date: Apr. 27, 2010

(87) PCT Pub. No.: WO2008/130555
PCT Pub. Date: Oct. 30, 2008

(65) Prior Publication Data
US 2010/0225876 A1    Sep. 9, 2010

Related U.S. Application Data

(60) Provisional application No. 60/912,044, filed on Apr. 16, 2007.

(51) Int. Cl.
*G02F 1/13* (2006.01)
*G02F 1/1335* (2006.01)

(52) U.S. Cl. .................. 349/187; 349/5; 349/96

(58) Field of Classification Search .............. None
See application file for complete search history.

(56) References Cited

U.S. PATENT DOCUMENTS
5,245,596 A    9/1993    Gupta et al.
(Continued)

FOREIGN PATENT DOCUMENTS
EP    0525478 A2    2/1993
(Continued)

OTHER PUBLICATIONS

First Office Action corresponding to Chinese Patent Application No. 2008-80012098.5; Date of Issue: Mar. 17, 2011; 16 pages.
(Continued)

*Primary Examiner* — Tina Wong
(74) *Attorney, Agent, or Firm* — Myers Bigel Sibley & Sajovec, P.A.

(57) ABSTRACT

A polarization grating includes a substrate and a first polarization grating layer on the substrate. The first polarization grating layer includes a molecular structure that is twisted according to a first twist sense over a first thickness defined between opposing faces of the first polarization grating layer. Some embodiments may include a second polarization grating layer on the first polarization grating layer. The second polarization grating layer includes a molecular structure that is twisted according to a second twist sense that is opposite the first twist sense over a second thickness defined between opposing faces of the second polarization grating layer. Also, a switchable polarization grating includes a liquid crystal layer between first and second substrates. The liquid crystal layer includes liquid crystal molecules having respective relative orientations that are rotated over a thickness defined between opposing faces thereof by a twist angle that is different from a relative phase angle between respective first and second periodic alignment conditions of the first and second substrates. Related devices and fabrication methods are also discussed.

36 Claims, 8 Drawing Sheets

U.S. PATENT DOCUMENTS

| | | | |
|---|---|---|---|
| 7,692,759 B2 * | 4/2010 | Escuti et al. | 349/201 |
| 2002/0180912 A1 | 12/2002 | Hsieh et al. | |
| 2005/0140837 A1 | 6/2005 | Crawford et al. | |
| 2008/0278675 A1 * | 11/2008 | Escuti et al. | 349/201 |
| 2010/0171909 A1 * | 7/2010 | Handschy | 349/98 |
| 2011/0188120 A1 | 8/2011 | Tabirian et al. | |
| 2011/0262844 A1 | 10/2011 | Tabirian et al. | |

FOREIGN PATENT DOCUMENTS

| | | |
|---|---|---|
| EP | 0632311 A1 | 1/1995 |
| WO | WO 2006/092758 A2 | 9/2006 |

OTHER PUBLICATIONS

First Office Action corresponding to Chinese Patent Application No. 2008-80012188.4; Date of Issue: Mar. 7, 2011; 8 pages.

Communication pursuant to Article 94(3) EPC corresponding to European Application No. 08 742 943.7 dated Apr. 8, 2011; 4 pages.

Communication pursuant to Article 94(3) EPC corresponding to European Application No. 08 742 945.2 dated Apr. 8, 2011; 4 pages.

Jones et al., *P-209: Evaluation of Projection Schemes for the Liquid Crystal Polarization Grating Operating on Unpolarized Light*; 2006 SID International Symposium, Society for Information Display; vol. XXXVI, pp. 1015-1017, May 24, 2005.

Dozov et al., *Planar Degenerated Anchoring of Liquid Crystals Obtained by Surface Memory Passivation*, Applied Physics Letters, AIP, American Institute of Physics, vol. 77, No. 25; pp. 4124-4126, Dec. 18, 2000.

Zhan et al., *Polarization Properties of Inversely twisted Nematic Liquid-Crystal Gratings*; Applied Optics Society of America, vol. 37, No. 28, pp. 6755-6763, Oct. 1, 1998.

Zhang et al. *Application of Photoalignment Technology to Liquid-Crystal-on-Silicon Microdisplays*; Japanese Journal of Applied Physics, vol. 44, No. 6A, pp. 3983-3991, (2005).

Sieberle, et al., *Photoalignment of LCoS LCDs*, Journal of the Society for Information Display, vol. 10, No. 1, pp. 31-35, (2002).

Zhang et al., *Silicon Microdisplay with Photo-alignment*, IEEE, Optoelectronics, Proceedings of the Sixth Chinese Symposium, pp. 228-230, Sep. 12-14, 2003.

Escuti et al., *39.4: Polarization-Independent Switching with High Contrast from a Liquid Crystal Polarization Grating*; Society for Information Display, vol. XXXVII, pp. 1443-1446, May 24, 2005.

Oh et al., *P-167 FDTD and Elastic Continuum Analysis of the Liquid Crystal Polarization Grating, g*; Society for Information Display, vol. XXXVII, pp. 844-847, May 24, 2005.

Avrutsky, et al., *High-Efficiency Single-Order Waveguide Grating Coupler*, Optical Society of America, vol. 15., No. 24; pp. 1446-1448, Dec. 15, 1990.

Crawford et al., *Liquid-Crystal Diffraction Gratings Using Polarization Holography Alignment Techniques*, Journal of Applied Physics, vol. 98, No. 12, pp. 123102-1-123102-10; Dec. 27, 2005.

Oh et al., *L-6: Late-News Paper Achromatic Diffraction Using Reactive Mesogen Polarization Gratings*, Society for Information Display, vol. XXXVIII, pp. 1401-1404, May 20, 2007.

Lu et al., *Low Voltage and Wide-Viewing-Angle Twisted Nematic Liquid Crystal Displays by Optical Compensation*, Japanese Journal of Applied Physics, vol. 39, No. 5A, Part 2; pp. L412-L415, May 1, 2000.

International Search Report, PCT/US2008/004888 and Written Opinion; Jul. 2, 2008.

International Preliminary Report on Patentability, PCT/US2008/004888; May 8, 2009.

Examination Report corresponding to European Patent Application No. 08742945.2 dated Jun. 4, 2010.

Examination Report corresponding to European Patent Application No. 08742939.5 dated Jun. 4, 2010.

European Communication Corresponding to European Application No. 11 178 032; Dated: Oct. 7, 2011; 10 pages.

* cited by examiner

LOW-TWIST CHIRAL LIQUID CRYSTAL POLARIZATION GRATINGS AND RELATED FABRICATION METHODS

CLAIM OF PRIORITY

The present application is a 35 U.S.C. §371 national phase application of PCT International Application No. PCT/US2008/004888, entitled "Low-Twist Chiral Liquid Crystal Polarization Gratings and Related Fabrication Methods", having an international filing date of Apr. 16, 2008, and claims priority to U.S. Provisional Patent Application No. 60/912,044, entitled "Low-Twist Chiral Liquid Crystal Polarization Gratings and Related Fabrication Methods", filed Apr. 16, 2007, the disclosures of which are hereby incorporated herein by reference as set forth in their entireties. The above PCT International Application was published in the English language and has International Publication No. WO 2008/130555.

FIELD OF THE INVENTION

The present invention relates to polarization gratings, and more particularly, to liquid crystal polarization gratings and related methods of fabrication.

BACKGROUND OF THE INVENTION

Liquid crystals may include liquids in which an ordered arrangement of molecules exists. Typically, liquid crystal (LC) molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties.

As a result of the rod-like or disk-like nature, the distribution of the orientation of LC molecules may play an important role in optical applications, such as in liquid crystal displays (LCDs). In these applications, LC alignment may be dictated by an alignment surface. The alignment surface may be treated so that the LC aligns relative to the surface in a predictable and controllable way. In many cases, the alignment surface may ensure a single domain through the LC device. In the absence of a treated alignment surface, the LC may have many domains and/or many discontinuities in orientation. In optical applications, these domains and discontinuities may cause scattering of light, leading to a degradation in the performance of the display.

Polarization gratings may be used to periodically affect the local polarization state of light traveling therethrough (as opposed to affecting the phase or amplitude as in conventional gratings). For example, switchable liquid crystal polarization gratings (LCPGs) can be used to implement an intensity modulator that can operate on unpolarized light. More particularly, such switchable LCPGs may be used to achieve relatively high contrast modulation of unpolarized light with a relatively narrow bandwidth (such as a laser), for example, in applications including projection displays and light-shutters. For instance, some conventional LCPGs may modulate light with a contrast ratio of greater than about 200:1 in the $0^{th}$-order for light having a bandwidth of <5%. However, the contrast modulation of conventional LCPGs may degrade when applied to modulate broadband light (such as from LEDs), which may be important in many applications.

SUMMARY OF THE INVENTION

According to some embodiments of the present invention, a polarization grating includes a substrate and a first polarization grating layer on the substrate. The first polarization grating layer includes a molecular structure that is twisted according to a first twist sense over a first thickness defined between opposing faces of the first polarization grating layer.

In some embodiments, respective relative orientations of molecules of the first polarization grating layer may be rotated by a first twist angle over the first thickness such that a local anisotropy pattern of the first polarization grating layer may have a continuously variable phase shift over the first thickness. Also, the substrate may be a reflective substrate.

In other embodiments, the polarization grating may further include a second polarization grating layer on the first polarization grating layer. The second polarization grating layer may include a molecular structure that is twisted according to a second twist sense opposite the first twist sense over a second thickness defined between opposing faces of the second polarization grating layer. In particular, respective relative orientations of molecules of the first polarization grating layer may be rotated by a first twist angle over the first thickness, and respective relative orientations of molecules of the second polarization grating layer may be rotated by a second twist angle over the second thickness.

In some embodiments, the second twist angle may be an opposite angle than the first twist angle. As such, a local anisotropy pattern of the second polarization grating layer may have a continuously variable phase shift over the second thickness that may be opposite to that of a local anisotropy pattern of the first polarization grating layer over the first thickness. For example, the second twist angle may be about +70 degrees, while the first twist angle may be about −70 degrees.

In other embodiments, the respective orientations of the molecules of the first and second polarization grating layers may be aligned along an interface therebetween. The substrate may be a transmissive substrate.

In some embodiments, the first polarization grating layer may be a first chiral liquid crystal layer including chiral liquid crystal molecules therein having the first twist sense. The second polarization grating layer may be a second chiral liquid crystal layer including chiral liquid crystal molecules therein having the second twist sense.

In other embodiments, at least one of the first and second polarization grating layers may be a polymerizable liquid crystal layer.

In some embodiments, another of the first and second polarization grating layers may be a non-reactive liquid crystal layer. For example, the non-reactive liquid crystal layer may be a nematic liquid crystal layer.

In other embodiments, the first and/or second thicknesses of the first and second polarization grating layers may be configured to provide half-wave retardation of light within an operational wavelength range of the polarization grating.

In some embodiments, the polarization grating may further include a first alignment layer on the substrate having a first periodic alignment condition therein. The first polarization grating layer may be on the first alignment layer, and molecules of the first polarization grating layer may be aligned according to the first periodic alignment condition of the alignment layer.

In other embodiments, the polarization grating may include a second alignment layer having a second periodic alignment condition therein on the first polarization grating layer opposite the first alignment layer. The first polarization grating layer may be a non-reactive liquid crystal layer between the first and second alignment layers. The non-reactive liquid crystal layer may include liquid crystal molecules having respective relative orientations that are rotated over the thickness by a twist angle that is different from a relative phase angle between the first and second periodic alignment conditions of the first and second alignment layers.

According to other embodiments of the present invention, a method of forming a polarization grating includes forming a substrate, and forming a first polarization grating layer on the substrate. The first polarization grating layer includes a molecular structure that is twisted according to a first twist sense over a first thickness defined between opposing faces of the first polarization grating layer.

In some embodiments, the first polarization grating layer may be formed to include molecules having respective relative orientations that are rotated by a first twist angle over the first thickness such that a local anisotropy pattern of the first polarization grating layer has a continuously variable phase shift over the first thickness. Also, the substrate may be a reflective substrate.

In other embodiments, a second polarization grating layer may be formed on the first polarization grating layer. The second polarization grating layer may include a molecular structure that is twisted according to a second twist sense opposite the first twist sense over a second thickness defined between opposing faces of the second polarization grating layer. In particular, the first polarization grating layer may be formed such that respective orientations of molecules of the first polarization grating layer may be rotated by a first twist angle over the first thickness. Likewise, the second polarization grating layer may be formed such that respective orientations of molecules of the second polarization grating layer may be rotated by a second twist angle over the second thickness.

In some embodiments, the second polarization grating layer may be formed on the first polarization grating layer such that the respective orientations of the molecules of the first and second polarization grating layers are aligned along an interface therebetween. The substrate may be a transmissive substrate.

In other embodiments, forming the first polarization grating layer may include doping a first liquid crystal layer with chiral liquid crystal molecules having the first twist sense. Also, forming the second polarization grating layer may include doping a second liquid crystal layer with chiral liquid crystal molecules having the second twist sense.

In some embodiments, a first alignment layer may be formed on the substrate. The first alignment layer may have a first periodic alignment condition therein. The first polarization grating layer may be formed directly on the first alignment layer such that molecules of the first polarization grating layer are aligned according to the first periodic alignment condition. Then, the second polarization grating layer may be formed on the first polarization grating layer.

In other embodiments, the first polarization grating layer may be a polymerizable liquid crystal layer. The polymerizable liquid crystal layer may be photo-polymerized on the first alignment layer prior to forming the second polarization grating layer thereon.

In some embodiments, a second alignment layer may be formed on a second substrate. The second alignment layer may have a second periodic alignment condition therein. The second substrate including the second alignment layer thereon may be assembled adjacent to the first polarization grating layer to define a gap between the second alignment layer and the first alignment layer, and the second polarization grating layer may be formed in the gap. For example, the second polarization grating layer may be a non-reactive liquid crystal layer.

In other embodiments, the second polarization grating layer may be a polymerizable liquid crystal layer.

In some embodiments, the first and/or second thicknesses of the first and second polarization grating layers may be configured to provide half-wave retardation of light within an operational wavelength range of the polarization grating.

According to further embodiments of the present invention, a switchable polarization grating includes a first substrate including a first periodic alignment condition, a second substrate including a second periodic alignment condition, and a liquid crystal layer between the first and second substrates. The liquid crystal layer includes liquid crystal molecules having respective relative orientations that are rotated over a thickness defined between opposing faces thereof by a twist angle that is different from a relative phase angle between the first and second periodic alignment conditions.

In some embodiments, the second periodic alignment condition may be out of phase relative to the first periodic alignment condition.

In other embodiments, the liquid crystal layer may be a nematic liquid crystal layer including a chiral dopant therein having a twist sense configured to twist a molecular structure of the liquid crystal layer by the twist angle over the thickness thereof.

In some embodiments, the liquid crystal molecules may be aligned according to the first and second alignment conditions of the first and second alignment layers at respective interfaces therebetween. The liquid crystal molecules may also be rotated by the twist angle over the thickness of the liquid crystal layer such that the liquid crystal layer comprises an elastic-energy strain therein.

In other embodiments, the phase angle may be about 70° to about 360°. Also, the twist angle may be about 70° to about 360°.

According to still further embodiments of the present invention, a method of fabricating a switchable polarization grating includes forming a first substrate including a first periodic alignment condition, forming a second substrate including a second periodic alignment condition, and forming a liquid crystal layer on the first and second substrates. The liquid crystal layer includes liquid crystal molecules having respective relative orientations that are rotated over a thickness defined between opposing faces thereof by a twist angle that is different from a relative phase angle between the first and second periodic alignment conditions.

In some embodiments, a first alignment layer may be formed on the first substrate and patterned to define the first periodic alignment condition therein. Also, a second alignment layer may be formed on the second substrate and patterned to define the second periodic alignment condition therein out of phase relative to the first periodic alignment condition.

In other embodiments, the liquid crystal layer may be a nematic liquid crystal layer. The nematic liquid crystal layer may be doped with a chiral molecule having a twist sense configured to twist a molecular structure of the liquid crystal layer by the twist angle over the thickness thereof.

In some embodiments, the liquid crystal layer may be formed such that the molecules thereof may be aligned according to the first and second alignment conditions of the first and second alignment layers at respective interfaces therebetween and may be rotated by the twist angle over the thickness of the liquid crystal layer such that the liquid crystal layer has an elastic-energy strain therein.

Other devices and/or methods of fabrication according to some embodiments will become apparent to one with skill in the art upon review of the following drawings and detailed description. It is intended that all such additional methods and/or devices be included within this description, be within the scope of the invention, and be protected by the accompanying claims.

DETAILED DESCRIPTION OF EMBODIMENTS OF THE INVENTION

Figure 1A:
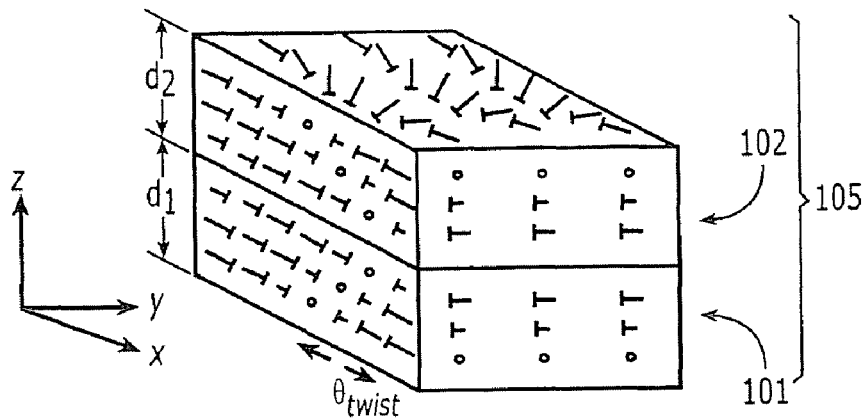
FIG. 1A is a perspective view illustrating polarization gratings according to some embodiments of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

It will be understood by those having skill in the art that, as used herein, a "transmissive" or "transparent" substrate may allow at least some of the incident light to pass therethrough. Accordingly, the transparent substrate may be a glass substrate in some embodiments. In contrast, a "reflective" substrate as described herein may reflect at least some of the incident light. Also, "polymerizable liquid crystals" may refer to relatively low-molecular weight liquid crystal materials that can be polymerized, and may also be described herein as "reactive mesogens". In contrast, "non-reactive liquid crystals" may refer to relatively low-molecular weight liquid crystal materials that may not be polymerized.

Embodiments of the present invention are described herein with reference to liquid crystal (LC) materials and polarization gratings composed thereof. As used herein, the liquid crystals can have a nematic phase, a chiral nematic phase, a smectic phase, a ferroelectric phase, and/or another phase. In addition, a number of photopolymerizable polymers may be used as alignment layers to create the polarization gratings described herein. In addition to being photopolymerizable, these materials may be inert with respect to the LC, should provide stable alignment over a range of operating temperatures of the LC device (e.g., from about −50° C. to about 100° C.), and should be compatible with manufacturing methods described herein. Some examples of photopolymerizable polymers include polyimides (e.g., AL 1254 commercially available from JSR Micro, Inc (Sunnyvale, Calif.)), Nissan RN-1199 available from Brewer Science, Inc. (Rolla, Mo.), and cinnamates (e.g., polyvinyl 4-methoxy-cinnamate as described by M. Schadt et al., in "Surface-Induced Parallel Alignment of Liquid Crystals by Linearly Polymerized Photopolymers," Jpn. J. Appl. Phys., Vol. 31 (1992), pp. 2155-2164). Another example of a photopolymerizable polymer is Staralign™, commercially available from Vantico Inc. (Los Angeles, Calif.). Further examples include chalcone-epoxy materials, such as those disclosed by Dong Hoon Choi and co-workers in "Photo-alignment of Low-molecular Mass Nematic Liquid Crystals on Photochemically Bifunctional Chalcone-epoxy Film by Irradiation of a Linearly Polarized UV," Bull. Korean Chem. Soc., Vol. 23, No. 4 587 (2002), and coumarin side chain polyimides, such as those disclosed by M. Ree and co-workers in "Alignment behavior of liquid-crystals on thin films of photosensitive polymers—Effects of photoreactive group and UV-exposure," Synth. Met., Vol. 117(1-3), pp. 273-5 (2001) (with these materials, the LC aligns nearly perpendicularly to the direction of polarization). Additional examples of methods of liquid crystal alignment are also discussed in and U.S. Pat. No. 7,196,758 to Crawford et al. Furthermore, some structures described herein may involve precise fabrication through a balance of spin-coating processes and liquid crystal materials. Additional structures and/or methods for use with some embodiments of the present invention are discussed in PCT Publication No. WO 2006/092758 to Escuti, et al., the disclosure of which is incorporated by reference herein in its entirety.

Some embodiments of the present invention provide methods and devices that can achieve achromatic (broadband), high contrast diffraction using a polarization grating having a twisted molecular structure along a thickness thereof. For example, in some embodiments, high contrast achromatic diffraction may be achieved by using two liquid crystal polarization grating layers of opposite twist sense that are laterally offset or shifted in phase relative to one another over their respective thicknesses. More particularly, a first polarization grating with a half-wave retardation thickness and a +70° twist is laminated with a second PG with a −70° twist on a transmissive substrate. In addition, when the first layer is embodied as a non-reactive liquid crystal layer and the second layer is embodied as a polymerizable liquid crystal layer (with respective twist angles of about +70° and about −70°, the grating may be switchable, and may provide a spatial-light-modulator suitable for use in a liquid crystal display (LCD). In other embodiments, a single polymer or non-reactive liquid crystal polarization grating layer having a 70° twist over a thickness thereof may be formed on a reflective substrate to provide similar results. Other twist angles may also be used in any of the above embodiments. In contrast, while a single-layer polarization grating may modulate unpolarized light, its high contrast operation may be limited to very narrow input light. Accordingly, as broadband light is present in many applications, some embodiments of the present invention may be used to provide substantially higher contrast and/or brightness as compared to existing technologies.

In addition, in low-twist liquid crystal polarization gratings according to some embodiments of the present invention, it may be possible to balance the chiral twist of the LC with the offset angle of the substrates in order to achieve an enhanced non-linear response of the electro-optical curve. Accordingly, a less-expensive and/or lower-power passive matrix addressing scheme may be used, instead of an active matrix addressing scheme which may require a TFT within every pixel. Such an addressing scheme may offer significant advantages, for example, in portable applications.

FIGS. 1A to 1D illustrate polarization gratings according to some embodiments of the present invention. As shown in FIG. 1A, a second polarization grating layer PG2 102 is formed on a first polarization grating layer PG1 101 to form a multi-layer structure 105. The first and second polarization grating layers PG1 101 and PG2 102 are chiral liquid crystal layers with molecular structures having an opposite twist sense relative to one another. In other words, the first and second polarization grating layers PG1 101 and PG2 102 include chiral molecules (i.e., asymmetric molecules having different left-handed and right-handed forms) of opposite handedness. As such, in some embodiments, the second polarization grating layer PG2 102 may have a phase shift of its local anisotropy pattern over a thickness $d_2$ opposite to that of the first polarization grating layer PG1 101 over a thickness $d_1$. The thicknesses $d_1$ and $d_2$ are respectively defined between opposing faces of the first and second polarization grating layers PG1 101 and PG2 102.

Figure 1B:
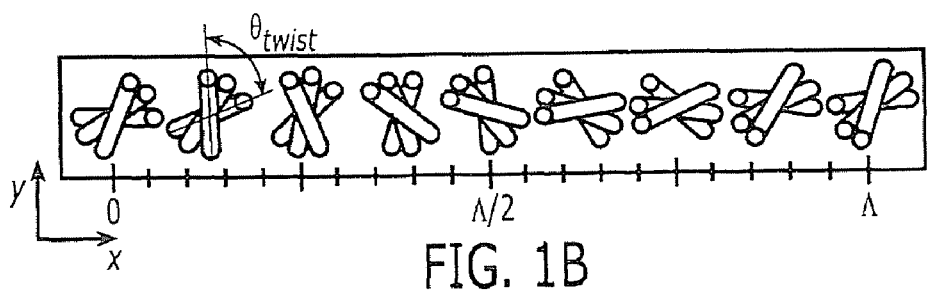
FIG. 1B is a top view illustrating polarization gratings according to some embodiments of the present invention.
Figure 1C:
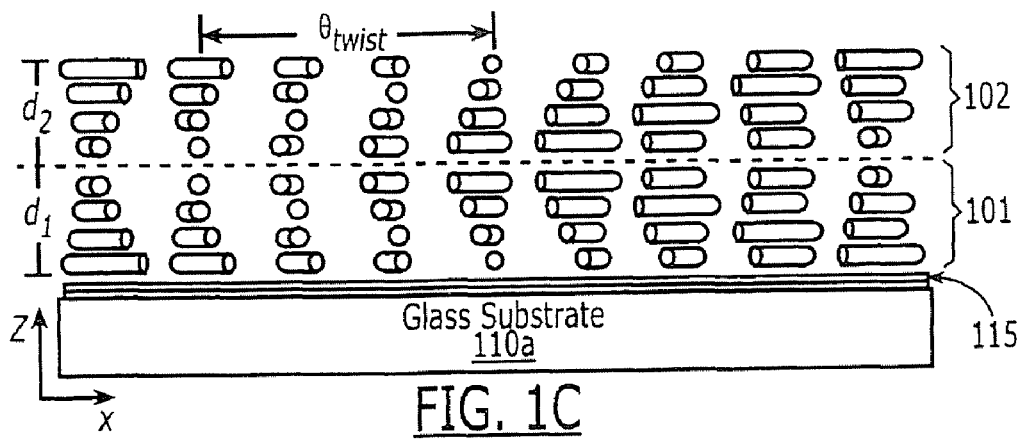
FIG. 1C is a side view illustrating polarization gratings according to some embodiments of the present invention.

More particularly, as shown in FIGS. 1B and 1C, the molecules of the second polarization grating layer PG2 102 are of an opposite handedness (left handed) as compared to the molecules of the first polarization grating layer PG1 101 (right handed). For example, the first polarization grating layer PG1 101 may be doped with a chiral molecule such that the orientation of the molecules therein may be rotated or "twisted" by a twist angle $\theta_{twist}$ over the thickness $d_1$ of the layer PG1 101, and the second polarization grating layer PG2 102 may be doped with another chiral molecule such that the orientation of the molecules therein may be "twisted" by an opposite twist angle $-\theta_{twist}$ over the thickness $d_2$ of the layer PG2 102. In some embodiments, the second polarization grating layer PG2 102 may have a twist angle $\theta_{twist}$ of about −70°, while the first polarization grating layer PG1 101 may have a twist angle $\theta_{twist}$ of about 70°. In such embodiments, the thickness $d_1$ of the first polarization grating layer PG1 101 may be substantially equal to the thickness $d_2$ of the second polarization grating layer PG1 102. In fabricating the first and second polarization grating layers PG1 101 and PG2 102, a nematic LC mixture may be doped with chiral LC molecules configured to induce the respective twist angles therein without substantial defects. The twist angle $\theta_{twist}$ may be altered by varying an amount of chiral dopant and/or a thickness of a polarization grating layer. The "twisting" of the molecules in each polarization grating over its thickness may provide a continuous phase-shifting in the local anisotropy pattern. As further illustrated in FIG. 1C, the molecules of the first and second polarization grating layers PG1 101 and PG2 102 are aligned or in-phase at the interface therebetween.

In some embodiments, the first and second polarization grating layers PG1 101 and PG2 102 may be single-substrate polymer layers, such as reactive mesogen (i.e., polymerizable liquid crystal) layers. For example, the first polarization grating layer PG1 101 may be formed by spin-casting a first chiral LC material (doped to provide a predetermined handedness or twist sense) on an exposed photo-alignment layer 115 such that it reaches the half-wave thickness for light used in operation of the polarization grating. The photo-alignment layer 115 may be formed and patterned on a transparent substrate, such as a glass substrate 110a, by well-known techniques that will not be discussed further herein. A second chiral LC mixture doped to provide the opposite handedness/twist sense may be directly applied on the first layer PG1 101 until it also has the half-wave thickness to form the second polarization grating layer PG2 102.

In other embodiments, a switchable liquid crystal polarization grating may be formed. More particularly, a polarization grating layer PG2 102 may be formed as described above with a predetermined handedness or twist sense (for example, −70°). An opposing transmissive substrate (such as a glass substrate 110a) including an exposed photo-alignment material 115 thereon may be laminated to the polarization grating layer PG2 102 with a cell gap corresponding to the half-wave cell thickness. The photo-alignment material 115 may include a periodic alignment condition that is offset based on the twist sense of the polarization grating layer PG2 102. The gap may be filled with a chiral nematic LC material having the opposite twist sense (for example, +70°) to provide a liquid crystal layer as the polarization layer PG1 101 between the photo-alignment layer 115 and the polarization grating layer PG2 102 and thereby define the switchable liquid crystal polarization grating.

Figure 1D:
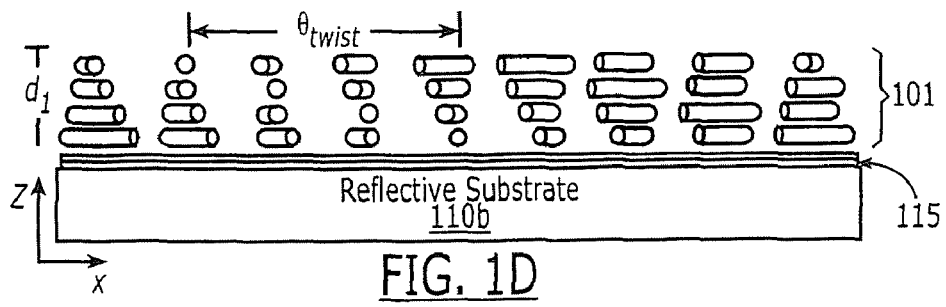
FIG. 1D is a side view illustrating polarization gratings according to further embodiments of the present invention.

FIG. 1D illustrates a polarization grating according to further embodiments of the present invention. The polarization grating of FIG. 1D includes a single polarization grating layer PG1 101 formed on a substrate, such as a reflective substrate 110b. For example, the polarization grating layer PG1 101 may be fowled on an exposed photo-alignment layer 115 on the reflective substrate 110b such that it reaches the half-wave thickness for light used in operation of the polarization grating. As discussed above, the polarization grating layer PG1 101 may be doped with a chiral molecule such that the orientation of the molecules therein may be rotated or "twisted" by a twist angle $\theta_{twist}$ over the thickness $d_1$ of the layer PG1 101 to provide a continuous phase-shifting in the local anisotropy pattern. The polarization grating layer PG1 101 may have a twist angle $\theta_{twist}$ of about 70°. However, the twist angle $\theta_{twist}$ may be altered by varying an amount of chiral dopant and/or a thickness of the polarization grating layer PG1 101. In some embodiments, the polarization grating layer PG1 101 may be a polymerizable liquid crystal layer, while in other embodiments, the polarization grating layer PG1 101 may be a non-reactive liquid crystal layer to provide a switchable liquid crystal polarization grating. Because the operational light may pass through the polarization grating layer PG1 101 twice (upon both incidence and reflection) due to the presence of the reflective substrate 110b, the single-layer polarization grating of FIG. 1l) may optically function in a manner similar to that of the two-layer polarization grating of FIG. 1C, which is further discussed in detail below.

Accordingly, some embodiments of the present invention provide diffractive optical elements wherein the direction and/or polarization state of transmitted light may be controlled over a broad spectral range. These diffractive optical elements may be used in display applications, for example, to provide more efficient outcoupling from backlights, polarization-independent pixel designs, and/or light recycling.

Polarization gratings (P0) according to some embodiments of the present invention may be anisotropic periodic structures, can manifest unique diffraction properties (such as three possible orders (0 and ±1) with special polarizations and up to 100% efficiency), and may support a wide range of applications. Conventional PGs may diffract with relatively high efficiency over a spectral range of about 7% of a center wavelength. In contrast, achromatic PGs according to some embodiments of the present invention may provide up to about a five-fold increase in this bandwidth, and may diffract with up to about 100% efficiency over a majority of the visible spectral range, even with broadband illumination (e.g., white light). In particular, PGs according to some embodiments of the present invention may include at least two chiral liquid crystal layers, each having a relatively modest twist angle (such as)70° and opposite twist sense.

Since the introduction of PGs as elemental polarization holograms, their diffraction properties and utility have been studied. For example, applications of PGs may include polarization measurement and hyperspectral polarimetry. Nematic liquid crystals (LCs) may create continuous-texture PGs with linear birefringence. Using this approach, substantially defect-free, switchable PGs may be created having desirable diffraction properties and/or relatively low scattering. Accordingly, switchable PGs may be used as polarization-independent modulators.

A conventional ("circular"-type) PG may include a spatially-variant uniaxial birefringence (i.e., n(x)=[cos(πx/Λ), sin(πx/Λ), 0]). The ideal diffraction efficiency at normal incidence can be derived as follows:

$$\eta_0 = \cos^2\left(\frac{\pi \Delta nd}{\lambda}\right) \text{ and } \eta_{\pm 1} = \frac{1}{2}[1 \mp S'_3]\sin^2\left(\frac{\pi \Delta nd}{\lambda}\right) \quad (1)$$

where $\eta_m$ is the diffraction efficiency of the $m^{th}$-order, $\lambda$ is the vacuum wavelength of incident light, $\Delta n$ is the linear birefringence, d is the grating thickness, and $S'_3=S_3/S_0$ is the normalized Strokes parameter corresponding to ellipticity of the incident light. Three orders (0 and ±1) may be present, and the first orders may possess orthogonal circular polarizations (left- and right-hand). The diffraction behavior of PGs may depend on the wavelength (through $\Delta nd/\lambda$ in Eq. (1)).

Referring again to FIGS. 1B and 1C, the achromatic performance of a PG including a two-layer twisted structure according to some embodiments of the present invention may provide up to 100% efficiency across a relatively wide spectral width, for example, up to about 34.3% of a center wavelength. This represents an increase by about a factor of five as compared to that of conventional PGs, which may provide a spectral width of about 6.8% of the center wavelength. Accordingly, achromacity of PG diffraction can be achieved by combining two twisted PGs with opposite twist sense.

Some design parameters for broadband diffraction of twisted PGs may include the thickness d and the twist angle $\theta_{twist}$ of each PG layer. Effects of these parameters have been demonstrated using the finite-difference time-domain (FDTD) method and an open-source software package especially developed for periodic anisotropic media. Accordingly, preliminary experimental results are discussed below with reference to FIGS. 2-6 for achromatic PGs formed as a polymerizable liquid crystal film using polarization holography and photo-alignment techniques.

Figure 2:
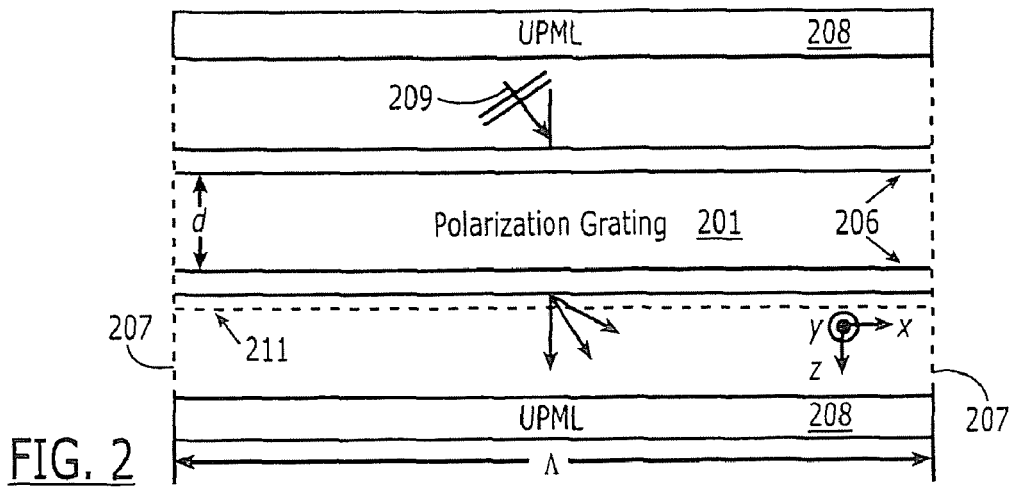
FIG. 2 is a diagram illustrating a model used to simulate properties of polarization gratings according to some embodiments of the present invention.

FIG. 2 illustrates the basic geometry of the FDTD simulation space described above. Gradient-index anti-reflection (AR) coatings 206 may be applied to the polarization grating PG 201 at both air-polarization grating interfaces to reduce and/or minimize Fresnel losses. Periodic boundaries 207 and matched layer boundaries 208 using the Uniaxial Perfectly Matched Layer (UPML) technique may be employed to terminate the simulation space and/or reduce simulation time. The input/incident planewave 209 may be a Gaussian-pulsed planewave (i.e., a wideband source) with vertical-linear polarization placed just before the grating structure, and the output diffraction efficiencies may be calculated from the electric field at a line 211 immediately after the grating. A near-to-far optical transformation and a temporal Fourier transform may be used to analyze spectral diffraction properties in the far-field.

As used herein, the spectral range $\Delta\lambda$ (in units of wavelength) for high PG efficiency is defined as the range of wavelengths over which the total first-order diffraction $\Sigma\eta_{\pm 1}$ is greater than about 99.5%. The normalized bandwidth $\Delta\lambda/\lambda_{center}$ (in units of %) is defined as the ratio of the spectral range to its center wavelength $\lambda_{center}$.

Figure 3:
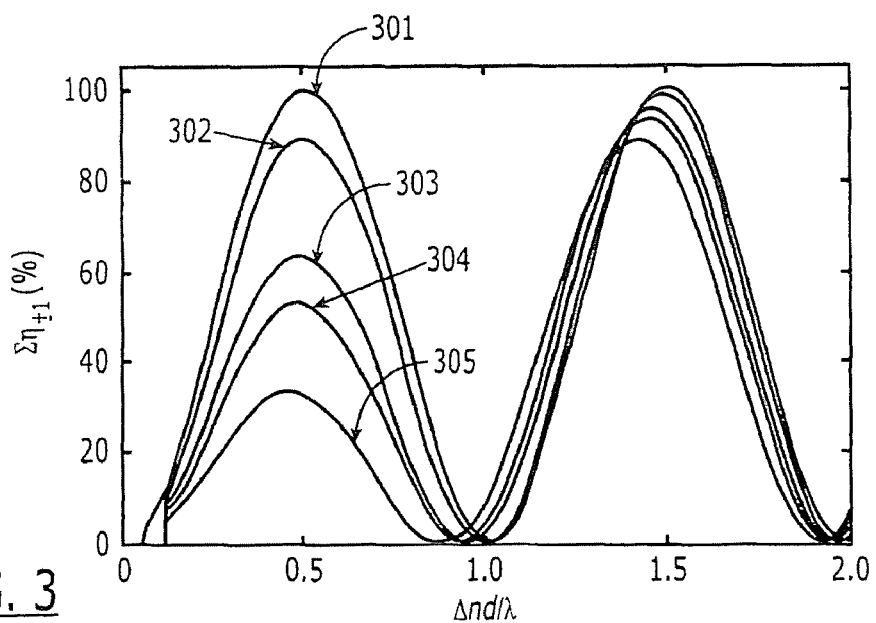
FIGS. 3, 4A and 4B are graphs illustrating properties of polarization gratings according to some embodiments of the present invention based on simulation results.

FIG. 3 illustrates simulation results showing diffraction properties of a single-layer twisted PG for a range of different twist angles from 0° to 90°. As such, the data may be the same for right- and left-handedness. More particularly, FIG. 3 illustrates a sum of the first-order efficiency ($\Sigma\eta_{\pm 1}$) versus normalized retardation ($\Delta nd/\lambda$) for different twist angles ($\theta_{twist}$) 0°, 30°, 60°, 70°, and 90°, respectively represented by waveforms 301, 302, 303, 304, and 305. As shown in FIG. 3, a maximum high-efficiency bandwidth occurs in the case of a conventional PG (i.e., illustrated by waveform 301 where $\theta_{twist}=0°$, and results in $\Delta\lambda/\lambda_{center}=6.8\%$. Accordingly, since the condition for adiabatic-following (also known as waveguiding) may not be met except for very small twist angles, a degradation in efficiency may result with increasing twist angles. Nevertheless, only the 0 and ±1-orders are present in the output and the first-order polarizations become increasingly elliptical (as opposed to circular).

However, high diffraction efficiency (i.e., up to about 100%) can be provided according to some embodiments of the present invention by stacking two twisted PGs with opposite twist sense. The optical properties of both PG layers may be substantially similar or identical (except for the direction of twist). As such, the second layer may compensate for the polarization effect of the first twisted structure. Therefore the achromatic effect may be qualitatively described as localized retardation compensation.

Figure 4A:
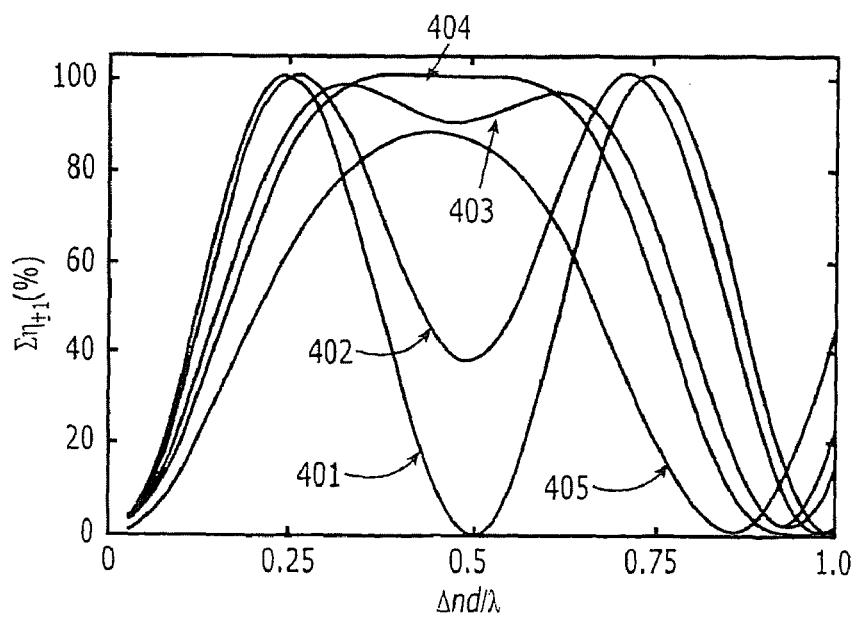
Figure 4B:
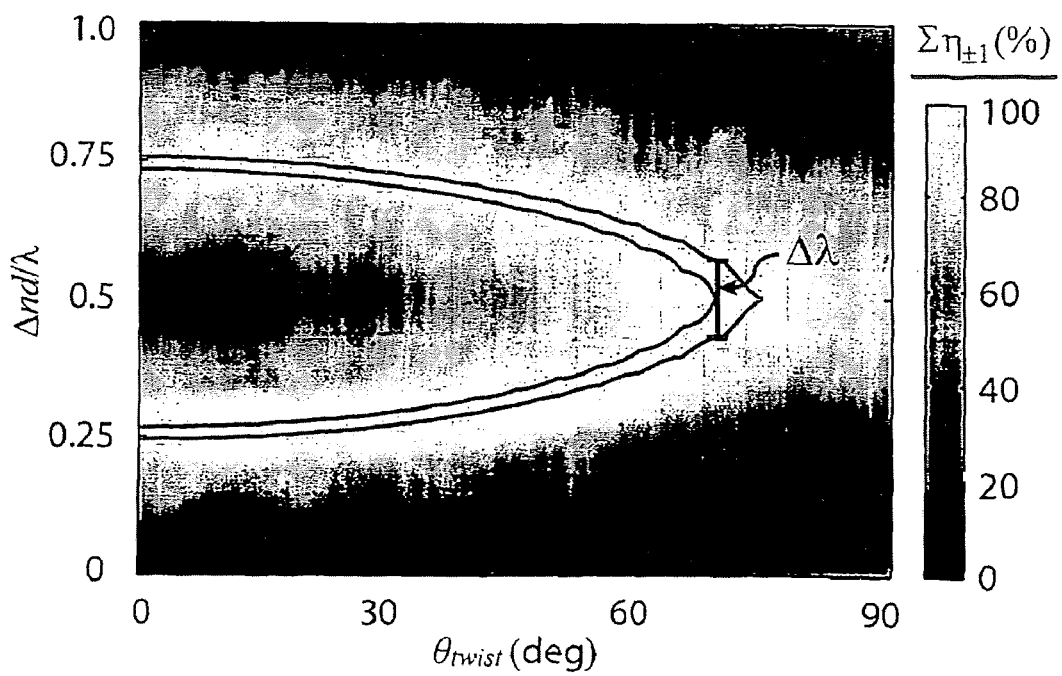

FIG. 4A illustrates simulation results showing diffraction properties of a two-layer twisted structure with opposite twist sense according to some embodiments of the present invention with varying twist angles over a range of about 0° to about 90°. More particularly, FIG. 4A shows the first order efficiency ($\Sigma\eta_{\pm 1}$) as a function of normalized retardation ($\Delta nd/\lambda$) for different values of $\theta_{twist}$ 0°, 30°, 60°, 70°, and 90°, respectively represented by waveforms 401, 402, 403, 404, and 405. The maximum bandwidth $\Delta\lambda/\lambda_{max}=34.3\%$ can be achieved when $\theta_{twist}=70°$, as further illustrated in FIG. 4B. More particularly, the gray scale levels of FIG. 4B illustrate simulated diffraction efficiency, and the bandwidth $\Delta\lambda/\lambda_{center}$ is at a maximum over the region shown. Accordingly, about a five-fold enhancement in the maximum diffraction bandwidth may be achieved as compared with a conventional PG. Since the diffraction bandwidth may be sensitive to the twist angle, careful control of $\theta_{twist}$ may be important to provide improved bandwidth performance.

Figure 5A:
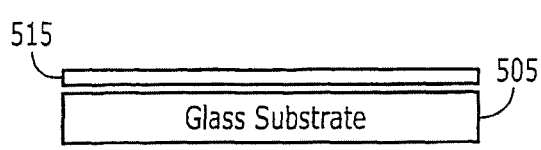
FIGS. 5A-5E are cross-sectional views illustrating methods of fabricating polarization gratings and devices so fabricated according to some embodiments of the present invention.
Figure 5B:
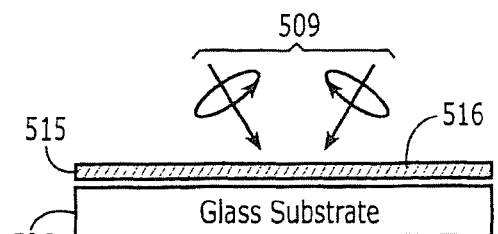
Figure 5C:
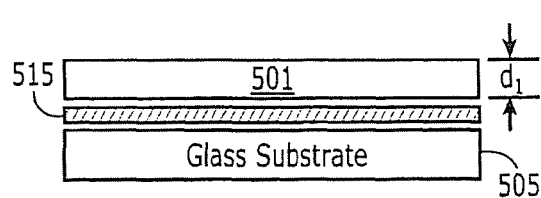
Figure 5D:
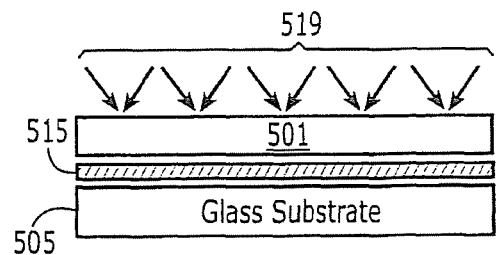
Figure 5E:
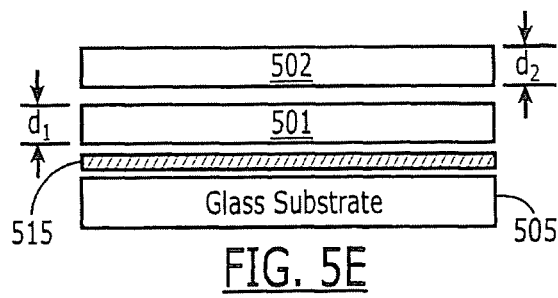

In some embodiments, achromatic PGs according to some embodiments of the present invention may be formed as a polymerizable liquid crystal film using a combination of polarization holography and photo-alignment techniques. Substantially defect-free RM PGs may be fabricated with relatively high efficiency and/or low scattering based on materials and processing optimization. As illustrated in FIGS. 5A-5E, fabrication of polymerizable liquid crystal PGs 501 and 502 may proceed as follows. As shown in FIG. 5A, a relatively thin layer of photo-alignment material 515 is coated on a substrate 505. The substrate 505 may be a transmissive or transparent substrate, such as a glass substrate, in some embodiments. However, in other embodiments, the substrate 505 may be a reflective substrate. The substrate 505 is exposed or patterned using coherent beams 509 from a laser with orthogonal circular polarizations at a relatively small angle to provide a polarization interference pattern 516 with a substantially constant intensity, as shown in FIG. 5B. In FIG. 5C, a first RM layer 501 having a first twist sense is formed on the photo-alignment layer 515 and is aligned according to the surface pattern 516. For example, a first RM mixture may be doped with a first chiral dopant and spin-cast onto the photo-alignment layer to provide the first RM layer 501. The first RM layer 501 is photo-polymerized, for example, using a blanket ultraviolet (UV) exposure 519, to permanently fix the large structured optical anisotropy, as shown in FIG. 5D. In FIG. 5E, a second RM layer 502 having an opposite twist sense is formed on the first RM layer 501. For example, a second RM mixture may be doped with a second chiral dopant, spin-cast onto the first RM layer 501, and photo-polymerized to provide the second RM layer 502. The second RM layer 502 is aligned based on the alignment of the first RM layer 501 at the interface therebetween.

Still referring to FIGS. 5A-5E, in some embodiments, a linear-photopolymerizable polymer (LPP), such as ROP-103 (Rolic), may be used as the photo-alignment material 515. A HeCd laser (325 nm) with orthogonal circular polarized beams may be used to expose or form a surface alignment pattern with a period of $\Lambda=8.5$ μm onto the photo-alignment layer 515. After photo-alignment exposure, the first and second RM films 501 and 502 may be deposited on the photo-alignment layer 515 on the substrate 505 by spin-coating. The first RM layer 501 may be a mixture composed of RMS03-001 (Merck, $\Delta n \sim 0.159$ at 589 nm) with a small amount (0.25%) of chiral dopant CB15 (Merck, right-handedness), and may be chosen so that the thickness $d_1$ of the first RM layer 501 reaches the half-wave thickness ($d=\lambda/2\Delta n$) and $\theta_{twist}=70°$. The second RM layer 502 may be deposited directly on top of the first RM layer 501, and may be composed of RMS03-001 doped with a small amount (0.34%) of a different chiral dopant ZLI-811 (Merck, left-handedness) subject to the same thickness and an opposite twist condition. Accordingly, the final grating thickness of a polarization grating according to some embodiments of the present invention may be 2d, because the two layers 501 and 502 may be stacked, each having a thickness of about the half-wave thickness d.

Figure 6A:
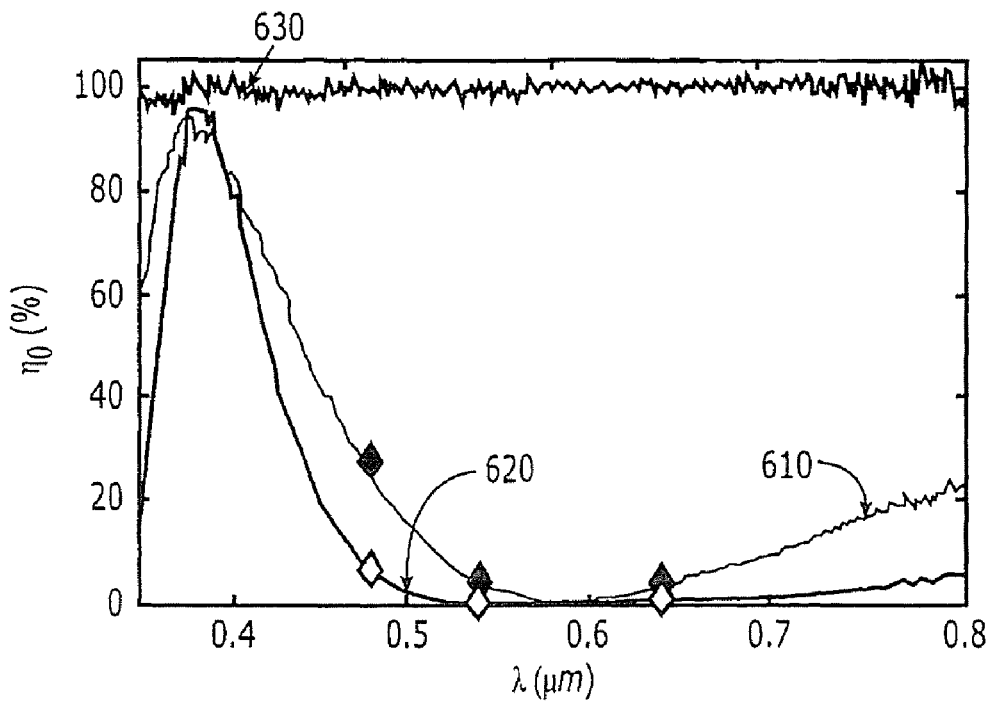
FIGS. 6A and 6B are graphs illustrating properties of polarization gratings according to some embodiments based on experimental results.
Figure 6B:
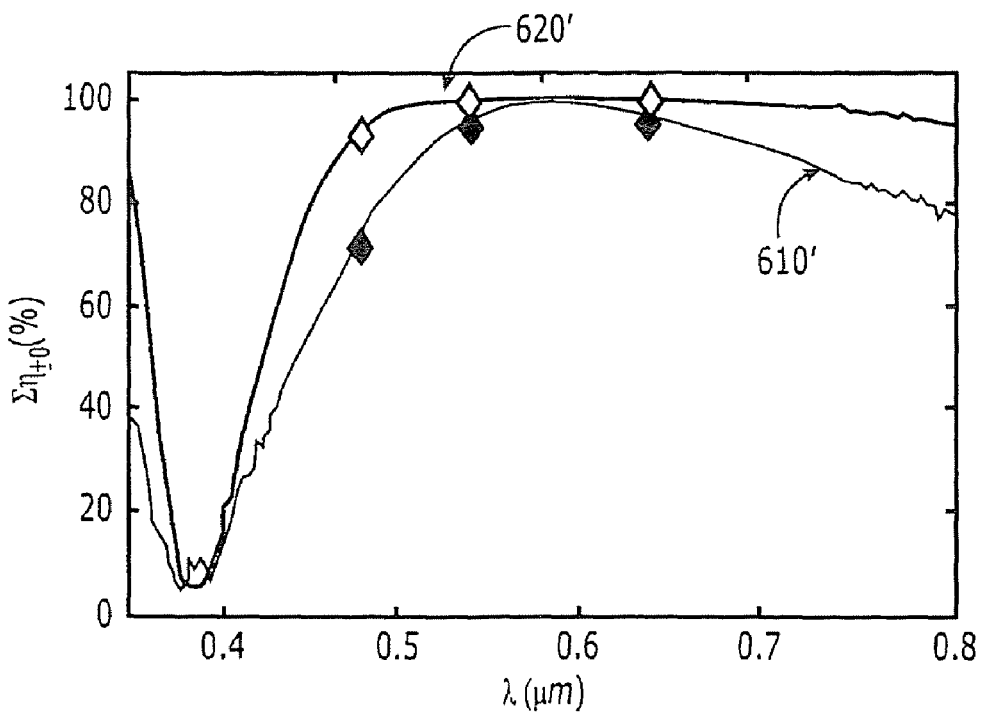

FIG. 6A provides experimental results illustrating 0-order efficiency spectra for a conventional PG (shown by waveform 610) and an achromatic PG according to some embodiments of the present invention (shown by waveform 620) as measured with a spectrophotometer. The measured transmittance of a clean glass slide (i.e., about 100%; shown by waveform 630) is also provided, and was measured under substantially similar conditions to the PGs. The spectra of the estimated diffraction efficiency calculated from the 0-order ($\Sigma\eta_{\pm 1}\approx 1-\eta_0$) for a conventional PG (610') and for an achromatic PG (620') according to some embodiments of the present invention is plotted in FIG. 6B. As expected from the FDTD simulation results of FIGS. 3 and 4A-4B, a noticeable improvement in the diffraction bandwidth is illustrated in FIGS. 6A and 6B. Efficiencies at three wavelengths were also measured with red (633 nm), green (532 nm), and blue (473 nm) lasers for both the conventional PG and the achromatic PG according to some embodiments of the present invention to confirm the estimated efficiencies shown in FIG. 6B. As used herein, the diffraction efficiency is defined as $\eta_m = I_m/I_{REF}$, where $I_m$ is the measured intensity of the $m^{th}$ transmitted diffracted order, and where $I_{REF}$ is a reference transmission intensity for a glass substrate. The incoherent scattering was roughly measured as about 2% or less above 400 nm by comparing the diffracted spectra to the clean glass slide.

Accordingly, achromatic PGs including at least two layers with opposite twist sense according to some embodiments of the present invention may provide diffraction properties such as three diffracted orders (0, ±1), orthogonal circular polarizations of the first orders, and/or highly polarization-sensitive first orders (which may be linearly proportional to the Stokes parameter). In addition, incident circular polarization can produce up to about 100% efficiency into one of the first orders, and linear incident polarization or unpolarized input can give up to about 50% efficiency into each of the first orders.

Compared to other LC gratings (i.e. polymer-wall LC gratings and/or HPDLC gratings), achromatic PGs according to some embodiments of the present invention may provide comparable or higher experimental diffraction efficiencies, and/or lower incoherent scattering. As such, achromatic PGs according to some embodiments of the present invention may offer the high efficiencies of thick (Bragg) gratings over nearly the entire range of visible light. When used as optical elements in displays, achromatic PGs according to some embodiments of the present invention may be integrated with other optical components, which may result in more compact and efficient displays. These diffractive optical elements may also be useful for beamsplitting, polarimetry, and more. In addition, a similar achromatic PG design can be implemented to provide a switchable LC grating for modulator applications. More particularly, one of the two twisted PG layers may be implemented with a non-reactive nematic liquid crystal material, and the entire structure may be placed between substrates with electrodes to provide the switchable LC grating.

Achromatic PGs including at least two layers with opposite twist sense according to some embodiments of the present invention may thereby achieve relatively high efficiency over a broad spectral range, and as such, may offer a wide range of potential applications in display technologies to provide more efficient control of light based its unique diffraction behavior. More particularly, such thin-film achromatic PGs may offer substantially more functional control than conventional diffraction gratings over the direction, intensity, and/or polarization state of the transmitted light (for a wide spectral bandwidth), and may offer potential benefits in many remote sensing applications.

In addition, achromatic PGs according to some embodiments of the present invention can be fabricated using known thin-film techniques and/or known liquid crystal materials to create an improved spatial-light-modulator element, for example, for use in polarization-independent microdisplays such as portable projection displays, consumer TV sets, real-time holography, etc. Moreover, in some instances, achromatic PGs according to some embodiments of the present invention may increase high contrast modulation over a wavelength range of up to about 45% of a desired center wavelength, which may result in up to a 900% improvement as compared to conventional single polarization gratings. Accordingly, in display applications, image quality may be significantly improved.

Furthermore, achromatic PGs according to some embodiments of the present invention may be used to provide an imaging polarization interferometer. As the PG may produce three diffracted orders and each of the first orders may have polarization sensitivity, a combination of the PG and a waveplate may allow separation of orthogonal polarization information into the two diffracted orders. Accordingly, a compact spectropolarimeter may be provided by combining this polarization selectivity and the chromatic dispersion of the PG. For example, instead of measuring intensities of each diffracted orders, the same polarization information (i.e. the Stokes parameters) can be extracted from the interferogram of two diffracted beams traveling through two substantially identical PGs. More particularly, the first PG may separate beams containing spectral images into two first orders, and the second PG may re-direct beams in parallel. The polarization state of each diffracted beam may be converted to the same linear polarization after traveling $\lambda/2$-waveplates oriented at a right angle with each other. The interference pattern can be obtained by focusing two diffracted beams on the same image plane where a detector locates.

Further embodiments of the present invention provide switchable liquid crystal polarization gratings (LCPGs) that may be controlled at the pixel-level using a passive matrix addressing scheme. Passive matrix addressing may employ a row-and-column voltage-averaging approach to reduce and/or eliminate the need for a thin-film-transistor (TFT) within each individual pixel, as used in higher-cost active matrix addressing. Accordingly, passive matrix addressing may be used in LCDs where low-power and low-cost are required (such as cell phones and PDAs). However, implementation of passive matrix addressing in LCPGs may require a relatively steep electro-optic response curve. In contrast, conventional LCPG technology may have a relatively poor electro-optic response curve, and as such, may not be suitable for use with passive matrix addressing. Accordingly, some embodiments of the present invention provide switchable LCPGs with significantly steeper (in slope) electro-optical response curves, which may improve the number of rows that can be passively addressed from about 1 row to more than about 100 rows. This may be comparable to conventional cell-phone LCDs based on the super-twisted-nematic (STN) configuration.

Figure 7A:
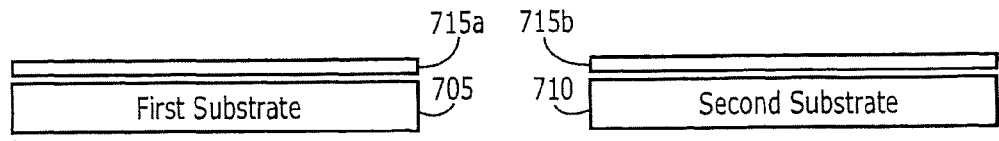
FIGS. 7A-7D are cross-sectional views illustrating methods of fabricating polarization gratings and devices so fabricated according to further embodiments of the present invention.
Figure 7B:
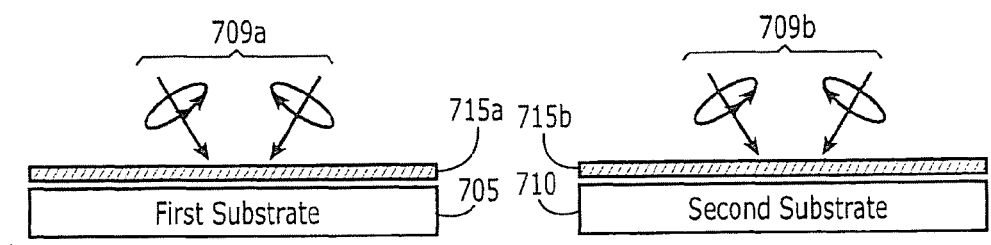
Figure 7C:
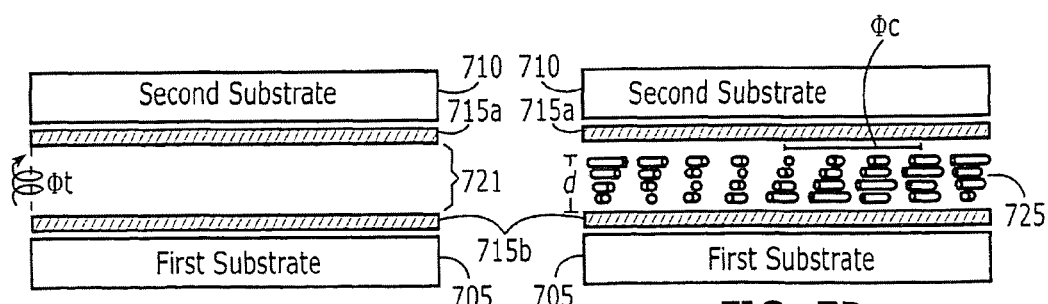
Figure 7D:
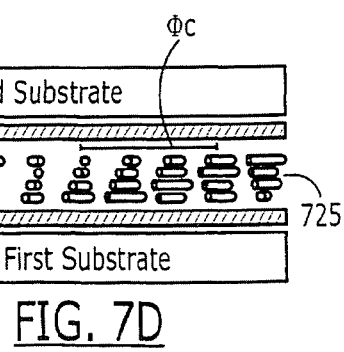

FIGS. 7A-7D are cross-sectional views illustrating methods of fabricating LCPGs and devices so fabricated according to further embodiments of the present invention. Referring now to FIG. 7A, relatively thin alignment layers 715a and 715b are respectively formed on first and second substrates 705 and 710. The first and/or second substrates 705 and/or 710 may be formed of a transmissive or transparent material, such as glass. Each substrate may also include transparent conductive electrodes (not shown). In FIG. 7B, the alignment layers 715a and 715b on each substrate are patterned so as to provide periodic alignment conditions on each substrate. For example, the alignment layers may be photo-alignment layers including photopolymerizable polymers therein, and may be holographically patterned using orthogonal circularly polarized laser beams 709a and 709b. The first and second substrates 705a and 710b are assembled as shown in FIG. 7C such that the periodic alignment conditions of the respective alignment layers 715a and 715b are offset by a relative phase angle Φt. Accordingly, as shown in FIG. 7D, a liquid crystal layer 725 having a predetermined twist sense is formed in the cell gap 721 between the first and second substrates. The liquid crystal layer may be a single layer of nematic LC doped with a chiral molecule to provide a particular twist Φc over the thickness d of the cell-gap 721. In other words, the twist angle Φc may provide a continuously variable phase-shift in the local anisotropy pattern over the thickness d of the liquid crystal layer. The molecules of the liquid crystal layer 725 may also be aligned based on the alignment conditions in the photo-alignment layers. Accordingly, when the twist angle $\Phi c$ is different from the substrate offset angle $\Phi t$, an elastic-energy strain can be generated in the liquid crystal layer, which may result in a more non-linear switching behavior. As with STN displays, this may be quantified by calculating the mid-layer tilt angle as a function of applied voltage, as further illustrated in the example simulation results of FIGS. 8A-8E.

Figure 8A:
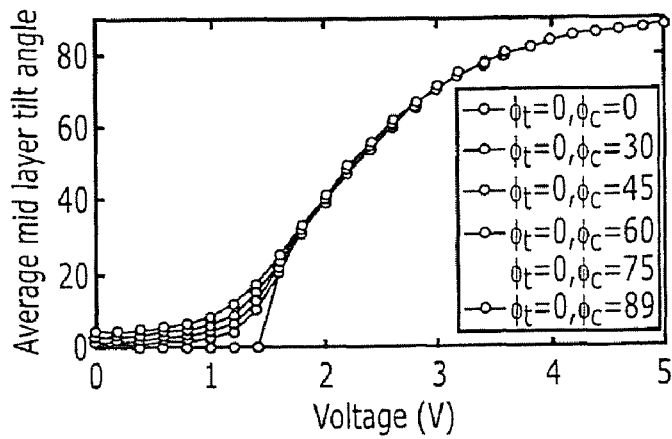
FIGS. 8A-8E are graphs illustrating electro-optical characteristics of polarization gratings according to further embodiments of the present invention.
Figure 8B:
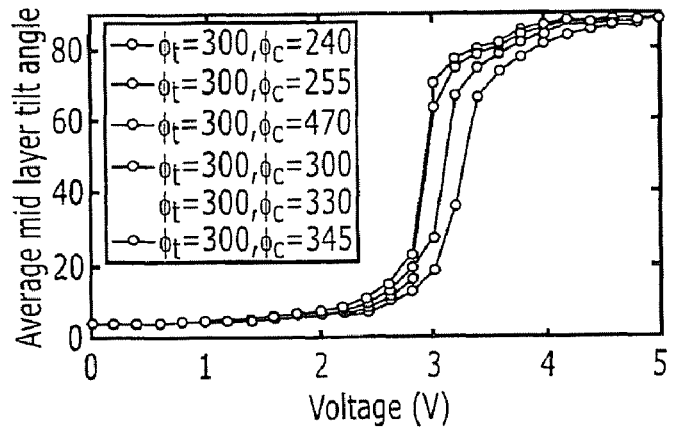
Figure 8C:
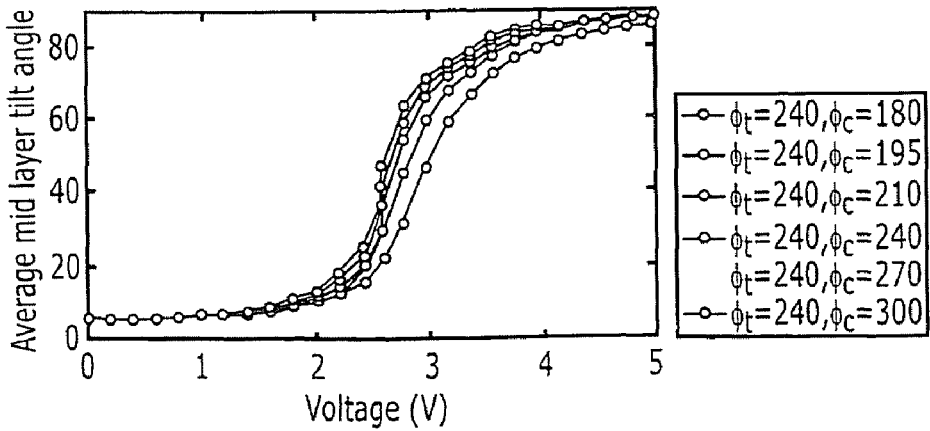
Figure 8D:
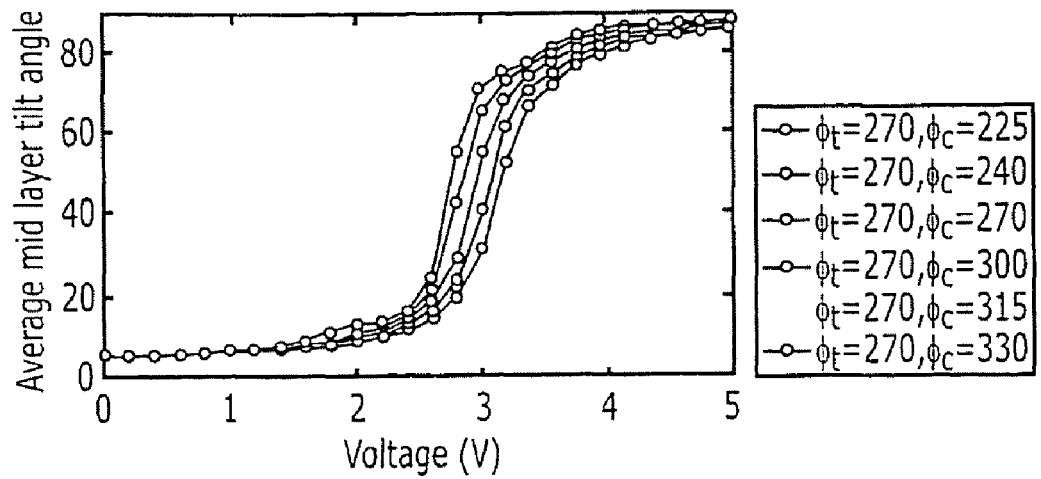

FIGS. 8A-8E illustrate the electro-optic response of LCPGs according to some embodiments of the present invention. As shown in FIGS. 8A-8E, as the twist angle $\Phi c$ is changed relative to the substrate offset angle $\Phi t$, a relatively steep electro-optic response may be obtained. More particularly, as illustrated in FIG. 8A, the baseline curves ($\Phi t=0°$, $\Phi c=0°$ to $89°$) may not be suitable for use with passive addressing, since it may enable only about 1 row with relatively good contrast. As further illustrated in FIG. 8B, in the case of the ($\Phi t=300°$, $\Phi c=240°$ to $345°$) design, the curves are significantly more steep. Accordingly, more than 100 rows may be passively-addressed. FIGS. 8C and 8D similarly illustrate the electro-optic response for varying values of $\Phi c$ when $\Phi t=240°$ and $270'$, respectively. Additional details regarding the above estimates may be found in the summary of STN display addressing in Scheffer and Nehring, Annual Review of Material Science 27, 555-583 (1997) and in Alt and Pleshko, IEEE Trans. Elec. Dev. ED-21, 146-155 (1974), the disclosures of which are incorporated by reference herein.

Figure 8E:
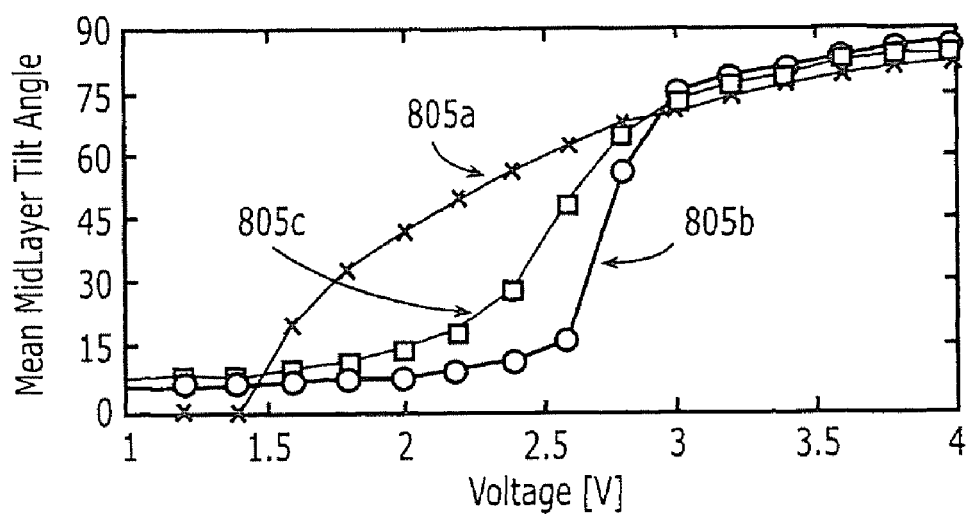

FIG. 8E illustrates the electro-optic response curves of FIGS. 8A, 8B, and 8C along a common set of axes for comparison. In particular, curve 805a illustrates the electro-optic response for the case where $\Phi t=0°$ and $\Phi c=0°$. Likewise, curve 805b shows the electro-optic response for the case where $\Phi t=300°$ and $\Phi c=240°$, while curve 805c illustrates the case where $\Phi t=240°$ and $\Phi c=180°$. Accordingly, FIG. 8E illustrates that the response curves can be made significantly more steep based on changes in the twist angle $\Phi c$ and the substrate offset angle $\Phi t$. In particular, the response curve 805b provides a relatively steep slope for improved switching behavior where the relative phase angle $\Phi t$ is greater than or equal to about $300°$, and where the twist angle $\Phi c$ is between about $240°$ and about $300°$. More generally, in some embodiments, the relative phase angle $\Phi t$ may be about $70°$ to about $360°$, and the twist angle $\Phi c$ may be about $70°$ to about $360°$.

Accordingly, LCPGs according to some embodiments of the present invention may use a chiral strain and a twist structure to provide a more non-linear electro-optical response curve. Thus, LCPGs according to some embodiments of the present invention may more readily switch from off- to on-states, and as such, may be more controllable using passive matrix addressing schemes.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. For example, it is to be understood that the structures described above with reference to FIGS. 1A-1D and FIGS. 7A-7D can be fabricated using non-switchable and/or switchable LC materials, in one or two substrate assemblies, respectively. Moreover, the substrates described herein may include one or more electrodes on surfaces thereof, for instance, provided by a transparent indium-tin-oxide (ITO) coating on the substrates. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed:

1. A polarization grating, comprising:
a first polarization grating layer comprising a molecular structure that is twisted according to a first twist sense over a first thickness defined between opposing faces of the first polarization grating layer such that respective relative orientations of molecules of the first polarization grating layer are rotated by a first twist angle over the first thickness throughout the first polarization grating layer; and
a second polarization grating layer on the first polarization grating layer, the second polarization grating layer comprising a molecular structure that is twisted according to a second twist sense opposite the first twist sense over a second thickness defined between opposing faces of the second polarization grating layer such that respective relative orientations of molecules of the second polarization grating layer are rotated by a second twist angle over the second thickness throughout the second polarization grating layer,
wherein the second twist angle is about +70 degrees, and wherein the first twist angle is about −70 degrees.

2. The polarization grating of claim 1, further comprising:
a substrate;
an alignment layer on the substrate, wherein the alignment layer does not substantially affect the local polarization state of light traveling therethrough,
wherein the first polarization grating layer is directly on the alignment layer.

3. The polarization grating of claim 1, wherein the second twist angle comprises an opposite angle than the first twist angle such that a local anisotropy pattern of the second polarization grating layer has a continuously variable phase shift over the second thickness opposite to that of a local anisotropy pattern of the first polarization grating layer over the first thickness.

4. The polarization grating of claim 1, wherein the respective orientations of the molecules of the first and second polarization grating layers are aligned along an interface therebetween.

5. The polarization grating of claim 1, wherein the first polarization grating layer comprises a first chiral liquid crystal layer including chiral liquid crystal molecules therein having the first twist sense, and wherein the second polarization grating layer comprises a second chiral liquid crystal layer including chiral liquid crystal molecules therein having the second twist sense.

6. The polarization grating of claim 1, wherein at least one of the first or second polarization grating layers comprises a polymerizable liquid crystal layer.

7. The polarization grating of claim 6, wherein another of the first and second polarization grating layers comprises a non-reactive liquid crystal layer.

8. The polarization grating of claim 7, wherein the non-reactive liquid crystal layer comprises a nematic liquid crystal layer.

9. The polarization grating of claim 2, wherein the substrate comprises a transmissive substrate.

10. The polarization grating of claim 1, wherein the first and/or second thicknesses are configured to provide half-wave retardation of light within an operational wavelength range of the polarization grating.

11. The polarization grating of claim 2, wherein the alignment layer comprises a first alignment layer including a first periodic alignment condition therein, and wherein molecules of the first polarization grating layer are aligned according to the first periodic alignment condition of the first alignment layer.

12. The polarization grating of claim 11, further comprising:
a second alignment layer including a second periodic alignment condition therein on the first polarization grating layer opposite the first alignment layer,
wherein one of the first or second polarization grating layers comprises a non-reactive liquid crystal layer between the first and second alignment layers.

13. A method of forming a polarization grating, the method comprising:
providing a first polarization grating layer comprising a molecular structure that is twisted according to a first twist sense over a first thickness defined between opposing faces of the first polarization grating layer such that respective orientations of molecules of the first polarization grating layer are rotated by a first twist angle over the first thickness throughout the first polarization grating layer; and
providing a second polarization grating layer on the first polarization grating layer, the second polarization grating layer comprising a molecular structure that is twisted according to a second twist sense opposite the first twist sense over a second thickness defined between opposing faces of the second polarization grating layer such that respective orientations of molecules of the second polarization grating layer are rotated by a second twist angle over the second thickness throughout the second polarization grating layer,
wherein the second twist angle is about +70 degrees, and wherein the first twist angle is about −70 degrees.

14. The method of claim 13, wherein providing the first polarization grating layer comprises:
forming an alignment layer that does not substantially affect the local polarization state of light traveling therethrough on a substrate; and
forming the first polarization grating layer directly on the alignment layer.

15. The method of claim 13, wherein the second twist angle comprises an opposite angle than the first twist angle such that a local anisotropy pattern of the second polarization grating layer has a continuously variable phase shift over the second thickness opposite to that of a local anisotropy pattern of the first polarization grating layer over the first thickness.

16. The method of claim 13, wherein forming the second polarization grating layer further comprises:
forming the second polarization grating layer on the first polarization grating layer such that the respective orientations of the molecules of the first and second polarization grating layers are aligned along an interface therebetween.

17. The method of claim 13, wherein providing the first polarization grating layer comprises doping a first liquid crystal layer with chiral liquid crystal molecules having the first twist sense, and wherein providing the second polarization grating layer comprises doping a second liquid crystal layer with chiral liquid crystal molecules having the second twist sense.

18. The method of claim 14, wherein the alignment layer comprises a first alignment layer including a first periodic alignment condition therein, and wherein forming the first and second polarization grating layers further comprises:
forming the first polarization grating layer directly on the first alignment layer such that molecules of the first polarization grating layer are aligned according to the first periodic alignment condition; and then
forming the second polarization grating layer on the first polarization grating layer.

19. The method of claim 18, wherein the first polarization grating layer comprises a polymerizable liquid crystal layer, and further comprising:
photo-polymerizing the polymerizable liquid crystal layer on the first alignment layer prior to forming the second polarization grating layer thereon.

20. The method of claim 19, wherein forming the second polarization grating layers comprises:
forming a second alignment layer on a second substrate, the second alignment layer having a second periodic alignment condition therein;
assembling the second substrate including the second alignment layer thereon adjacent to the first polarization grating layer to define a gap between the second alignment layer and the first alignment layer; and
forming the second polarization grating layer in the gap.

21. The method of claim 20, wherein the second polarization grating layer comprises a non-reactive liquid crystal layer.

22. The method of claim 19, wherein the second polarization grating layer comprises a polymerizable liquid crystal layer.

23. The method of claim 14, wherein the substrate comprises a transmissive substrate.

24. The method of claim 13, wherein the first and/or second thicknesses are configured to provide half-wave retardation of light within an operational wavelength range of the polarization grating.

25. A switchable polarization grating, comprising:
a first substrate including a first periodic alignment condition;
a second substrate including a second periodic alignment condition; and
a nematic liquid crystal layer between the first and second substrates, the nematic liquid crystal layer including a chiral dopant therein configured to twist a molecular structure of the nematic liquid crystal layer over a thickness defined between opposing faces thereof by a twist angle that is different from a relative phase angle between the first and second periodic alignment conditions,
wherein the first and second periodic alignment conditions provide a same periodicity along respective interfaces with the nematic liquid crystal layer.

26. The switchable polarization grating of claim 25, wherein the second periodic alignment condition is out of phase relative to the first periodic alignment condition.

27. The switchable polarization grating of claim 25, wherein the chiral dopant is configured to induce rotation of respective relative orientations of molecules of the nematic liquid crystal layer by the twist angle over the thickness thereof throughout the nematic liquid crystal layer.

28. The switchable polarization grating of claim 25, wherein molecules of the nematic liquid crystal layer are aligned according to the first and second alignment conditions of the first and second alignment layers at the respective interfaces therebetween, and are rotated by the relative phase angle over the thickness of the nematic liquid crystal layer such that the nematic liquid crystal layer comprises an elastic-energy strain therein due to the difference between the twist angle and the relative phase angle.

29. The switchable polarization grating of claim 25, wherein the phase angle comprises about 70° to about 360°.

30. The switchable polarization grating of claim 29, wherein the twist angle comprises about 70° to about 360°.

31. A method of fabricating a switchable polarization grating, the method comprising:
providing a first substrate including a first periodic alignment condition;
providing a second substrate including a second periodic alignment condition;
doping a nematic liquid crystal layer with a chiral molecule configured to twist a molecular structure of the nematic liquid crystal layer; and
forming the nematic liquid crystal layer on the first and second substrates, the nematic liquid crystal layer including the chiral molecule therein configured to twist the molecular structure of the nematic liquid crystal layer over a thickness defined between opposing faces thereof by a twist angle that is different from a relative phase angle between the first and second periodic alignment conditions,
wherein the first and second periodic alignment conditions provide a same periodicity along respective interfaces with the nematic liquid crystal layer.

32. The method of claim 31, wherein forming the first and second substrates comprises:
forming a first alignment layer on the first substrate;
patterning the first alignment layer to define the first periodic alignment condition therein;
forming a second alignment layer on the second substrate; and
patterning the second alignment layer to define the second periodic alignment condition therein out of phase relative to the first periodic alignment condition.

33. The method of claim 31, wherein the chiral molecule is configured to induce rotation of respective relative orientations of molecules of the nematic liquid crystal layer by the twist angle over the thickness thereof throughout the nematic liquid crystal layer.

34. The method of claim 31, wherein forming the liquid crystal layer comprises:
forming the nematic liquid crystal layer such that molecules thereof are aligned according to the first and second alignment conditions of the first and second alignment layers at the respective interfaces therebetween, and are rotated by the relative phase angle over the thickness of the nematic liquid crystal layer such that the nematic liquid crystal layer comprises an elastic-energy strain therein due to the difference between the twist angle and the relative phase angle.

35. The method of claim 31, wherein the phase angle comprises about 70° to about 360°.

36. The method of claim 35, wherein the twist angle comprises about 70° to about 360°.

* * * * *

UNITED STATES PATENT AND TRADEMARK OFFICE
CERTIFICATE OF CORRECTION

PATENT NO. : 8,339,566 B2  
APPLICATION NO. : 12/596189  
DATED : December 25, 2012  
INVENTOR(S) : Escuti et al.

Page 1 of 1

It is certified that error appears in the above-identified patent and that said Letters Patent is hereby corrected as shown below:

In the Specifications:
Column 9, Line 66: Please correct "(P0)" to read -- (PG) --

Column 15, Line 24: Please correct "and 270'," to read -- and 270°, --

Signed and Sealed this  
Thirteenth Day of August, 2013

Teresa Stanek Rea  
*Acting Director of the United States Patent and Trademark Office*